July 31, 1956    R. H. REED    2,757,374
SCRAPER CONVEYOR
Filed Dec. 14, 1951    4 Sheets-Sheet 3
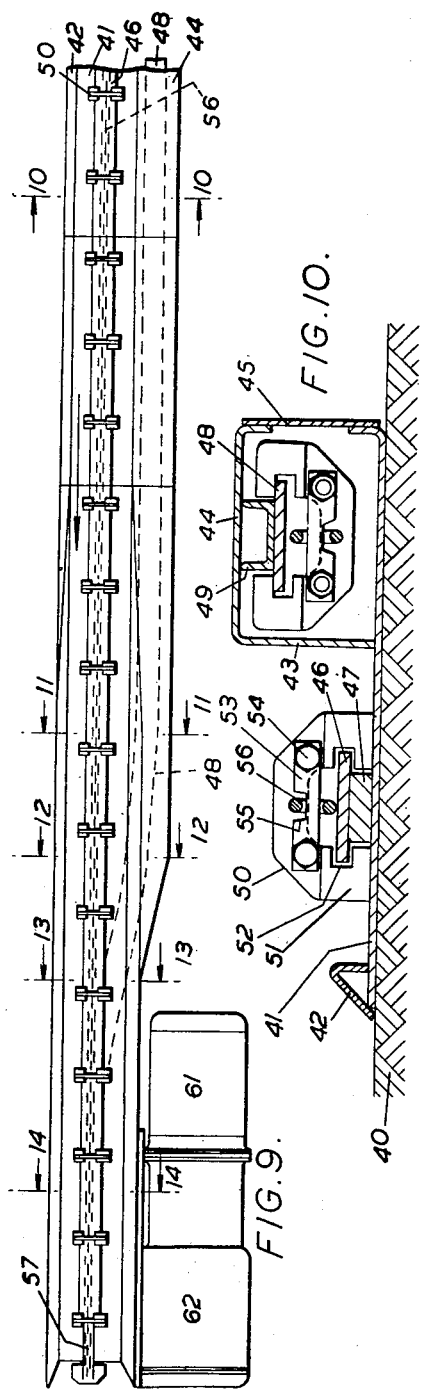
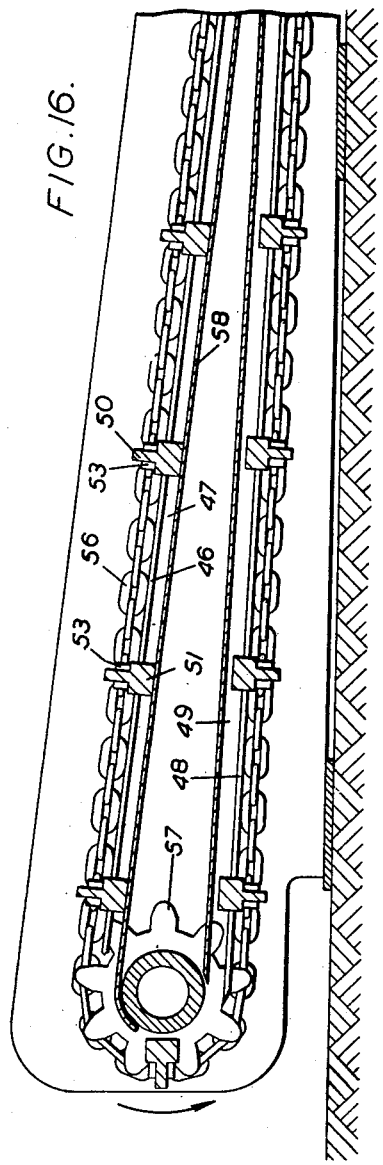
Inventor:
ROBERT HENRY REED
By
Richardson, David and Nordon
Attorneys

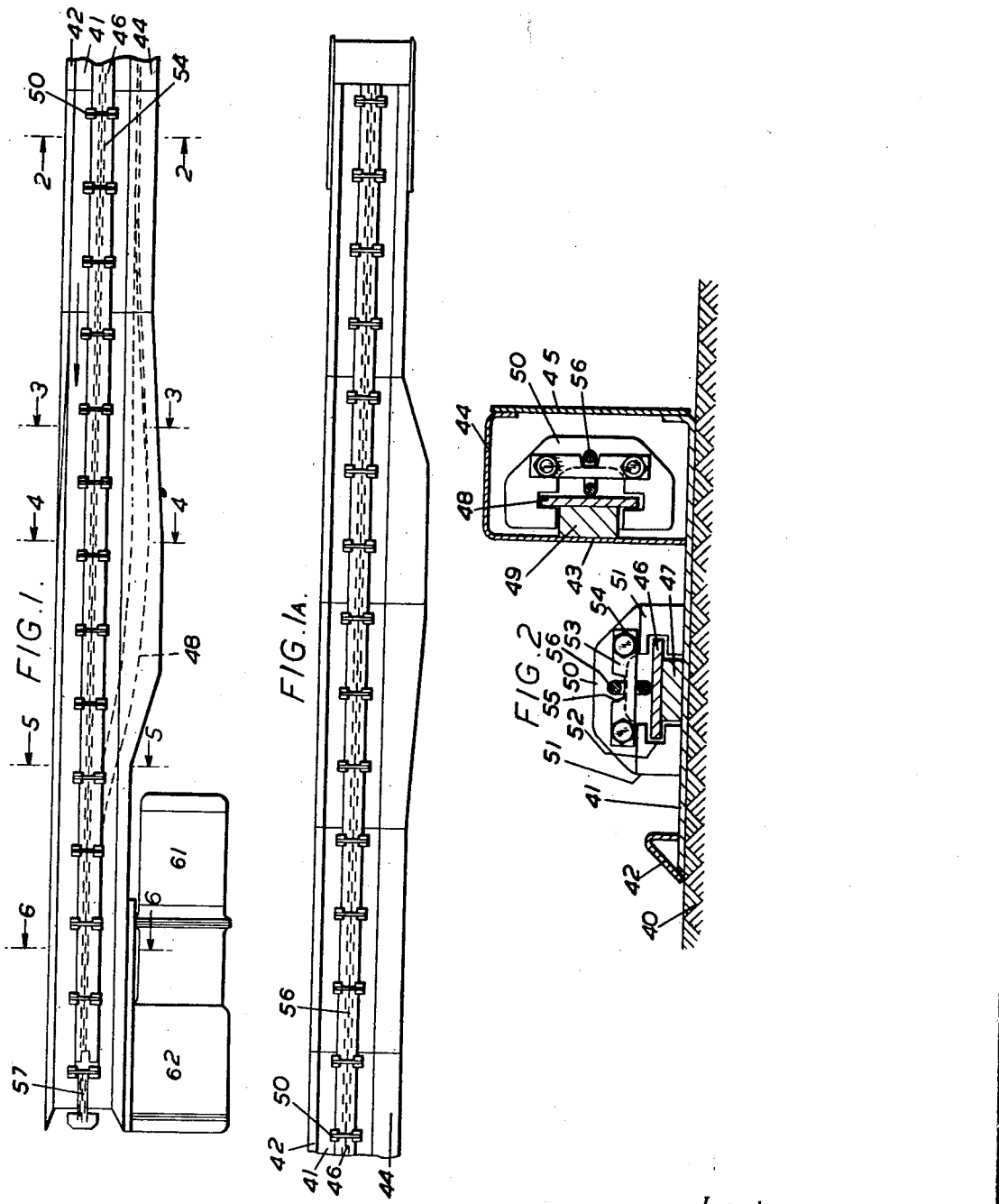

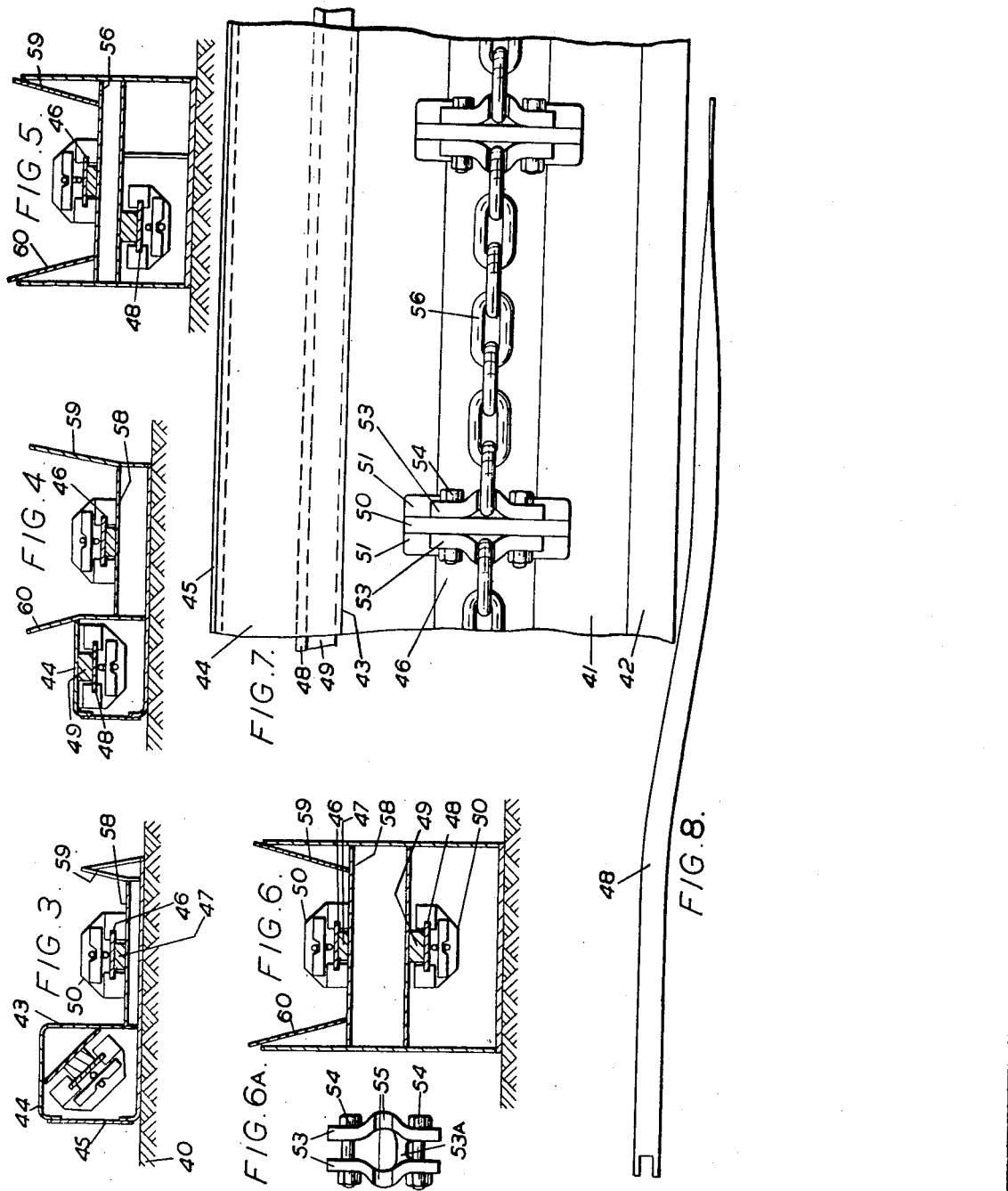

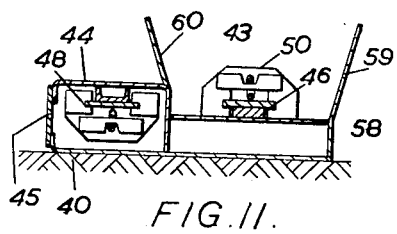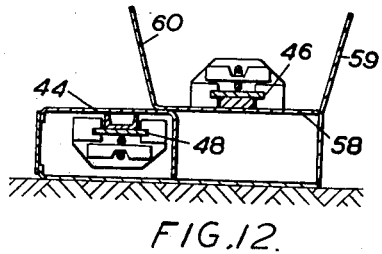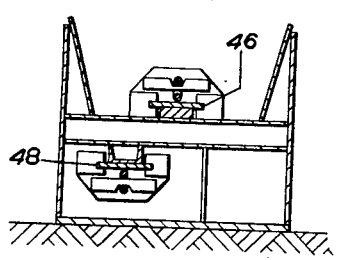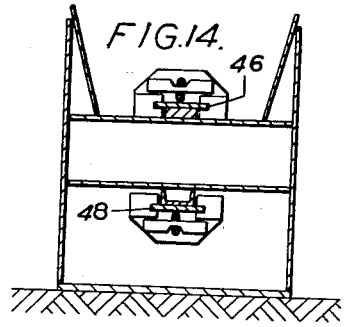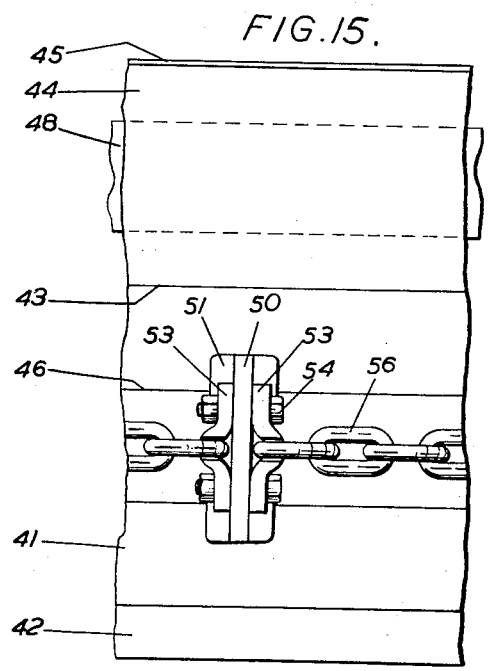

United States Patent Office 2,757,374
Patented July 31, 1956

2,757,374

SCRAPER CONVEYOR

Robert Henry Reed, Glasgow, Scotland, assignor to Mavor & Coulson Limited, Glasgow, Scotland, Great Britain Application December 14, 1951, Serial No. 261,613

Claims priority, application Great Britain February 13, 1951

3 Claims. (Cl. 198—171)

This invention relates to conveyors of the type including an endless series of interconnected components, or "scrapers," which in their working run travel along a passage and entrain with them the coal or other mineral supplied to said passage for conveyance. Conveyors of this type, known as "scraper conveyors," are used for instance as so-called "face conveyors" in coal mines worked by the "longwall" system for the conveyance of coal stripped from the face of the seam.

Scraper conveyors as hitherto used sometimes include an endless chain to which the components are attached midway of their length. The conveyance passage and a return runway are provided by a stationary frame structure, composed of end-to-end sections, along which the components travel in the working and return directions.

It has been proposed to provide the frame structure of a mine face conveyor with a wall at the "goaf" side (i. e. the outer side opposite to the face of the seam) which is comparatively high in order to act as a retainer for the broken-down mineral supplied from the face to the conveyor.

It is desirable that a conveyor of the type stated, when designed for work as a face conveyor, shall work close to the mine floor in order that either the mining machine can readily transfer the broken-down coal laterally outwards from the face and mine floor to the conveyance passage along which the scraper components travel or the conveyor can be forced laterally inward below the broken-down coal so as to load the coal upon the conveyance passage.

It is also desirable that a conveyor of the type stated, when designed for work as a face conveyor, shall be compact in width in order that propping of the otherwise unsupported mine roof can be extended to near the face.

Moreover, when such a conveyor has to be used in cooperation with a continuous mining machine, it is also desirable that the conveyor can be laterally advanced without dismantling, or "snaked" as it is called, in order that as the face is progressively cut away the conveyor can be brought section-after-section as close as practicable to the new face.

The object of the invention is to provide an improved conveyor of the type stated having the aforesaid desirable features.

According to the present invention, a conveyor of the type stated comprises a frame structure, which is formed with a mineral-conveyance passage having a housing along its outer side, and an endless chain trained to travel in two successive runs, namely a working run along the middle of said passage and a laterally spaced return run along a raised runway through the interior of said housing, said chain being composed of an endless series of mineral-entraining components inter-connected midway of their length by loosely inter-looped chain links.

Preferably, the conveyor has guides which extend along the middle of the conveyance passage and at a raised level along the housing and which engage said components so as to control the setting of said components, the arrangement of the guides being such that the components lie down when travelling along the passage and either hang down or are upturned when returning along the runway through the housing.

Seeing that the conveyance passage can be disposed at a very low level above the mine floor, the work of supplying the broken down mineral to the conveyor is facilitated. Moreover, if the mineral-entraining components are held in an upturned setting—especially a fully upright setting—in the return runway, the housing can be correspondingly reduced in width so that the arrangement of the housing need not add seriously to the overall width of the conveyor frame structure.

It will be manifest that the height of the housing is not significant, seeing that it incorporates a retaining wall necessary in any construction at the outer side of the conveyor frame structure to retain the mineral in the conveyance passage.

Examples of conveyors embodying the invention will now be described with reference to the accompanying drawings, in which:

Figs. 1 and 1A together form a plan of one example of the conveyor, a long portion being broken away from the middle of the conveyor. Figs. 2, 3, 4, 5 and 6 are sections respectively on the lines 2—2, 3—3, 4—4, 5—5 and 6—6 of Fig. 1. Fig. 6A shows a modification. Fig. 7 is a plan of a short portion of the conveyor, this view corresponding to Fig. 2. Fig. 8 is a plan of one of the parts shown mainly in dotted lines in Fig. 1. Figs. 3 to 6 are drawn to a larger scale than Figs. 1 and 1A, and Figs. 2 and 7 are drawn to a still larger scale.

Figs. 9 to 15 are views corresponding to Figs. 1 to 7, but showing another example of the conveyor, Figs. 10 to 14 being sections on the lines 10—10, 11—11, 12—12, 13—13 and 14—14 respectively of Fig. 9. Fig. 16 is a sectional elevation corresponding to a portion of Fig. 9, the section being on the line 16 thereof.

In the example according to Figs. 1 to 8, a conveyor according to the invention is designed for use in a coal mine to co-operate with a continuous mining machine in the longwall system, the mine floor being indicated by 40. The frame structure includes plating which in cross-section comprises a base-plate 41 provided at the inner side, throughout its effective working length, with a narrow ramp 42 sloping to floor level. Fig. 2 shows the sectional form of the frame structure throughout its effective working length. The base-plate 41 is also provided, at the outer side, with a housing 43, 44, 45. The base-plate 41 is also provided, midway between the ramp and housing, with a double-flanged rail 46, 47 approximately of T-section, serving as a guide to engage with coal-engaging components (hereinafter described) in the working run of the conveyor and hold them so that they lie down upon the base-plate. The inner side of the housing is formed by an upstanding plate 43 which serves as a retaining wall. The base-plate between this wall 43 and the ramp 42 provides the conveyance passage for the mined coal.

In the example, a guide 48, 49 inside the housing 43, 44, 45 is designed to engage the coal-engaging components of the return run of the conveyor chain in such a way that in the return runway through the housing they are fully upright—that is to say, in a setting at a right-angle to the lying-down setting of the working run. Therefore, the requisite guide also comprises a double-flanged rail, approximately of T-section, being arranged along the retaining-wall component 43 of the housing at a raised level.

The housing also includes a roof plate 44 and an outer side wall 45, so that in the example the housing forms a complete enclosure for the return run. If desired, the housing need not be a complete enclosure. For instance, the outer wall 45 might be omitted in order to give access to the interior of the structure. Alternatively, or additionally, the portion of the base-plate below the housing might be omitted.

The conveyor chain includes coal-engaging components, which are shown best in Figs. 2 and 7. Each of these components comprises a transverse web, 50, a pair of side blocks 51 forged or cast integral with the web and arranged below it, as viewed when arranged in the working run, the proximal faces of the side blocks being recessed at 52 to engage the double flange 46 (or 48) of the guide rail, and a pair of transverse looped members 53 which are arranged on opposite faces of the web and are interconnected by bolts 54 which penetrate the web.

Although in the example the members 53 are separate parts they may advantageously be made as a single part, the looped members to be interconnected by an integral connector 53A, as shown by Fig. 6A. Such a connector 53A passes the web 50 of the associated component.

Each of the members 53 is looped, having an outward bend formed to simulate a portion of a horizontal chain link. Above the bend, each member is recessed midway of its length at 55. The arrangement is such that the coal-engaging components are a loose fit on the double-flanged rails and are freely slidable along them, each component when in its working run extending crosswise as a so-called "flight" or scraper upon the base-plate 41.

The conveyor chain also includes short lengths of several links 56, seven links being shown in Fig. 7, between each two coal-engaging components. These links, are of usual loosely inter-looping oval form, and the end links of each length are looped through the looped members 53 of the coal-engaging components which they interconnect. In effect, the components themselves form links of the total conveyor chain, and it extends along the middle of the conveyance passage between the parts 42 and 43, the links 56 being attached to the components 50—53 midway of the length of the webs 50. The end links of short length are vertical, and they engage between the aforesaid recesses 55, the sides of which serve as link-retaining protuberances.

At and near both ends of the conveyor frame structure, the normal cross-sectional form according to Fig. 2 varies progressively to allow for the changing conditions between the working run and the return run, the variations being represented by Figs. 3, 4, 5 and 6. Moreover, at both ends, in line with the working run of the conveyor chain links 56, there are the usual sprocket-wheels 57 (Fig. 1) one (or each) of which is a driving wheel. The construction of the sprocket-wheel 57 is similar to that of the one shown in Fig. 16 hereinafter described. The sprocket-wheel 57 is driven by an electric motor 61 through gears in a case 62 (Fig. 1). Each wheel 57 is arranged in a vertical plane and rises above the level of the base-plate 41, the progressive rise of the chain links 56 being clear from Figs. 3 to 6, which show that a rising plate 58 is provided above the base plate in the conveyance passage, and that the ramp 42 and inner housing wall 43 both merge into inclined side plates 59, 60. It will be apparent that the working-run guide rail 46, 47 leads straight at an inclination from its low working level to the sprocket-wheel 57. On the other hand, the return-run guide rail 48, 49, starting from its Fig. 6 position directly above the working rail 46, 47 and at the level of the top of the sprocket-wheel, gradually curves outwards and downwards to the level of the return run and also twists through a right angle; that is to say, the double-flange 48 is horizontal in Fig. 6 but vertical in Fig. 2. The curving and twisting will be clear from Fig. 8 and also from the dotted outline in Fig. 1. In this transition the rail 48, 49 when it enters the housing is supported initially by the roof 44 (Fig. 4) and finally by the inner wall 43 at a level above the rail 46, 47. Thus, the setting of each coal-engaging component 50 changes to the extent of a right angle in its passage to and from each sprocket wheel. This change of setting is permitted by the looseness in the chain linkages between the components.

Therefore, it will be manifest that in the example according to Figs. 1 to 8, the coal-entraining components 50 lie down upon the base-plate 41 when travelling along the conveyance passage but are upturned to an erect setting when returning along the inner wall 43 of the housing.

In the example according to Figs. 9 to 16, the coal-engaging components 50 are not upturned in the return run, but hang down; that is to say, they retain the upside-down setting in which they pass to and from the sprocket-wheels. In this example, the return-run guide rail 48, 49 is arranged at a raised level inverted on the underside of the roof plate 44 of the housing. Other parts of the conveyor similar or corresponding to parts already described with reference to Figs. 1 to 8 are again given the same reference numerals. As will be apparent from Figs. 14, 13, 12 and 11, in this order, the return-run rail 48 is directly below the working-run rail 46, 47 as they extend from the sprocket-wheel 57 and progressively curves laterally outwards as the rail 46, 47 lowers, until eventually the normal Fig. 10 position is reached in which the rail 46, 47 is below the raised level of the rail 48, 49 and the latter is spaced sidewise to the outer side of the rail 46, 47.

It will be apparent that the arrangement of the return-run housing and guide rail may be such that the coal-engaging components are not turned fully upright in the return run but may instead adopt an intermediate setting, for instance one requiring a turn through forty-five degrees.

I claim:

1. A conveyor of the scraper type for working along a coal face in a coal mine and comprising spaced mineral-entraining components, a chain consisting of loosely inter-looped chain links interconnecting said components midway of the length of each, said components and links forming an endless series, a base-plate forming a mineral-conveyance passage for said components, a housing along the outer portion of the base-plate, namely that portion which is further from the coal face in operation of the conveyor, said housing including a roof and serving as a return passage for said components and also as a mineral-retaining wall to said mineral-conveyance passage, an upright rail upon the base-plate extending along the mineral-conveyance passage, an inverted rail located inside said housing and extending along its roof at a level raised in comparison with the upright rail, said inverted rail near its ends being curved inwards to come vertically above said upright rail, and chain wheels rotatable in vertical planes aligned with said upright rail and with the ends of said inverted rail, said endless series engaging round said wheels and being constrained by them to travel along said rails with the mineral-entraining components held upright in the mineral-conveyance passage and suspended upside-down in the return passage.

2. A conveyor according to claim 1 in which the upright rails are longitudinal members with top flanges, the inverted rails are longitudinal members with bottom flanges and each of the mineral-entraining components has side blocks that slidably engage the flanges of both rails.

3. A conveyor according to claim 2 in which the flanges of both rails are formed by longitudinal plating secured to the longitudinal members and projecting therefrom at both sides of each of said members.

References Cited in the file of this patent

UNITED STATES PATENTS

| | | |
|---|---|---|
| 1,001,097 | Turner | Aug. 22, 1911 |
| 1,821,440 | Levin | Sept. 1, 1931 |
| 1,920,500 | Garcia et al. | Aug. 1, 1933 |
| 2,607,469 | Hapman | Aug. 19, 1952 |
| 2,622,382 | Slavens | Dec. 23, 1952 |

FOREIGN PATENTS

| | | |
|---|---|---|
| 323,764 | Germany | Aug. 6, 1920 |
| 311,551 | Great Britain | May 16, 1929 |
| 413,172 | Great Britain | July 12, 1934 |
| 679,604 | Germany | Aug. 10, 1939 |